United States Patent [19]

Katagi

[11] 3,920,372
[45] Nov. 18, 1975

[54] APPARATUS FOR MANUFACTURING UNTWISTED SYNTHETIC RESIN STRING
[75] Inventor: Fusao Katagi, Sakai, Japan
[73] Assignee: Katagi Goseikagaku Kabushiki Kaisha, Osaka, Japan
[22] Filed: Nov. 14, 1974
[21] Appl. No.: 523,914

[52] U.S. Cl............ 425/391; 425/319; 425/324 R; 425/384; 425/404
[51] Int. Cl.² ................... B29C 17/00; B29C 25/00
[58] Field of Search........ 425/319, 324 R, 334, 363, 425/404, 445, 364, 391

[56] References Cited
UNITED STATES PATENTS

| 3,470,583 | 10/1969 | Denyes et al.................. | 425/391 X |
| 3,565,730 | 2/1971 | Weisshuhn..................... | 425/384 X |
| 3,632,726 | 1/1972 | Knox et al..................... | 425/404 X |
| 3,744,106 | 7/1973 | Baum et al..................... | 425/445 X |

Primary Examiner—J. Howard Flint, Jr.
Attorney, Agent, or Firm—Armstrong, Nikaido & Wegner

[57] ABSTRACT

Apparatus comprising stretching means for stretching a strip of thermoplastic resin film at least longitudinally thereof, first guide means disposed to the rear of the stretching means and comprising a pair of rotatable members for nipping the stretched film strip on its front and rear surfaces widthwise thereof, second guide means disposed to the rear of the first guide means and located at a position deviated from the direction of straight advance of the film strip toward one side, and takeup means disposed to the rear of the second guide means. When the stretched film sent out from the first guide means passes through the second guide means, the second guide means restrains one side edge of the film strip. The opposite side edges of the stretched film strip are progressively gathered together toward the direction of advance of the film strip while the film strip advances from the first guide means to the second guide means. The restrained one side edge of the film strip is thereby rolled up helically, permitting the other side edge thereof to be helically rolled around the resulting rolled portion, whereby an untwisted string having a spiral cross section is obtained. The apparatus may further include heat-setting means and heating means. The heat-setting means is incorporated into the second guide means or disposed to the rear of the second guide means to heat-set the outer peripheral portion of the rolled string without heat-setting its interior. The heating means is provided to the front of the second guide means to heat-set only one edge of the helically rolled strip on the outer surface of the string.

10 Claims, 18 Drawing Figures

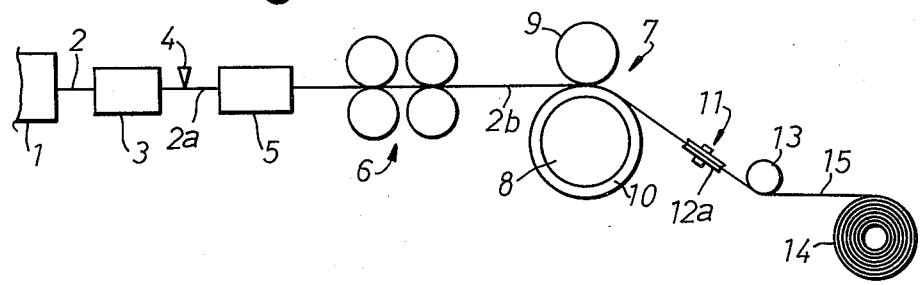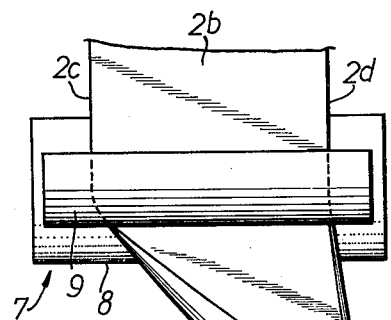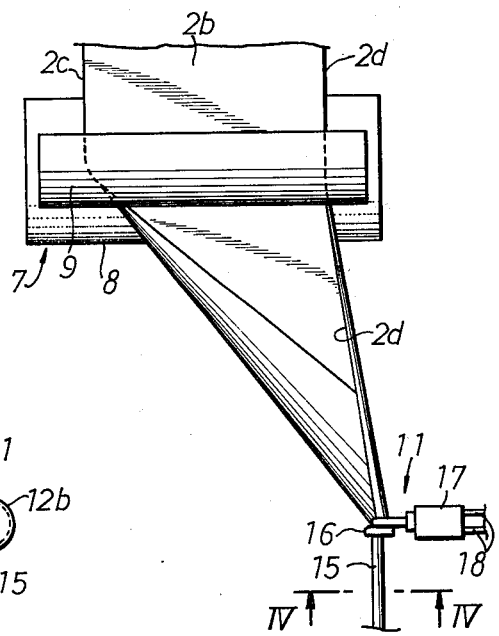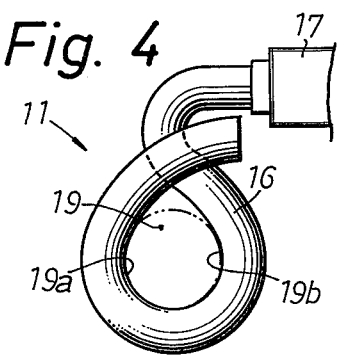

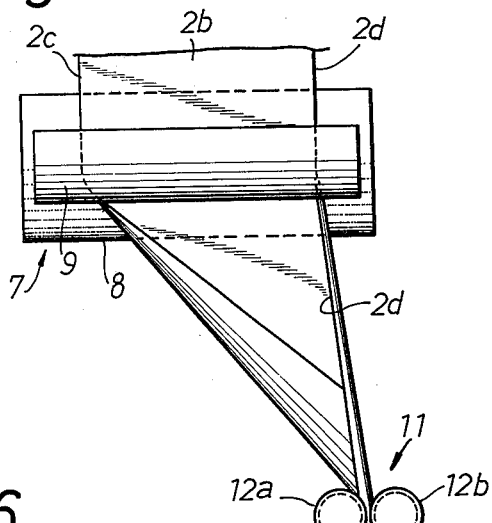
Fig. 5
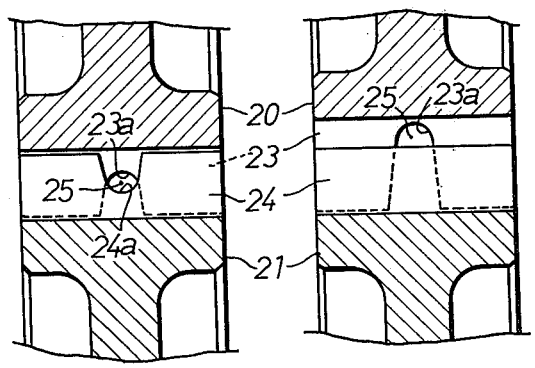
Fig. 6
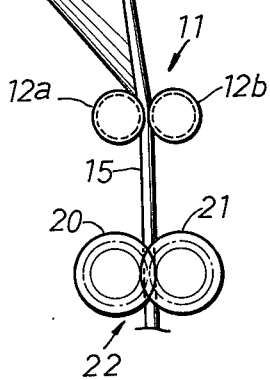
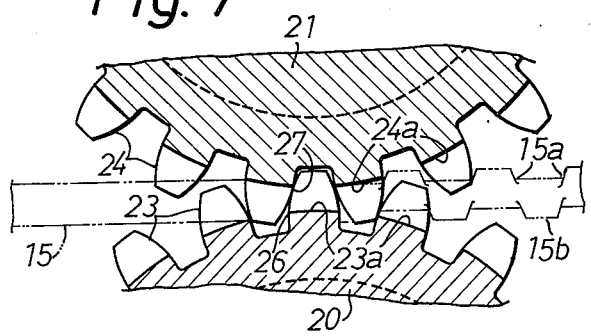
Fig. 7

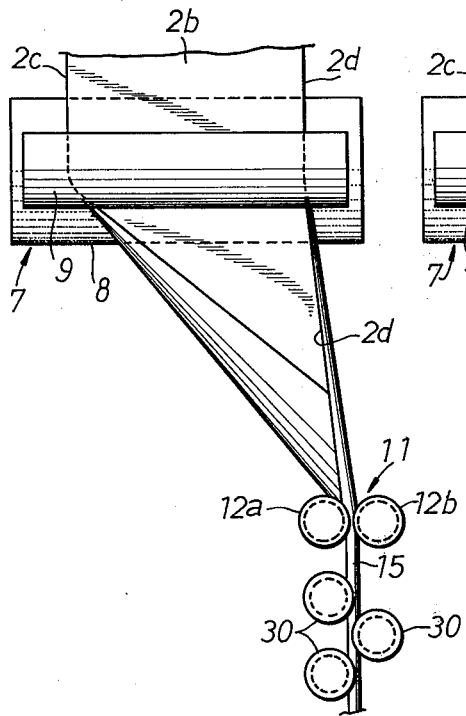
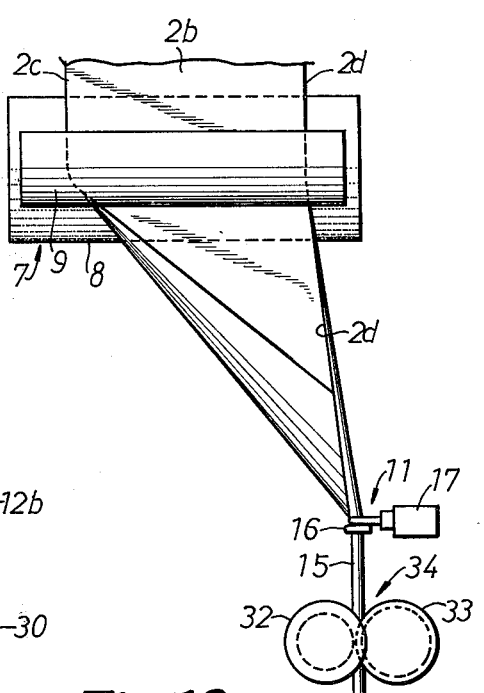
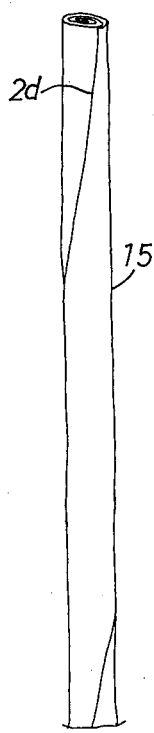
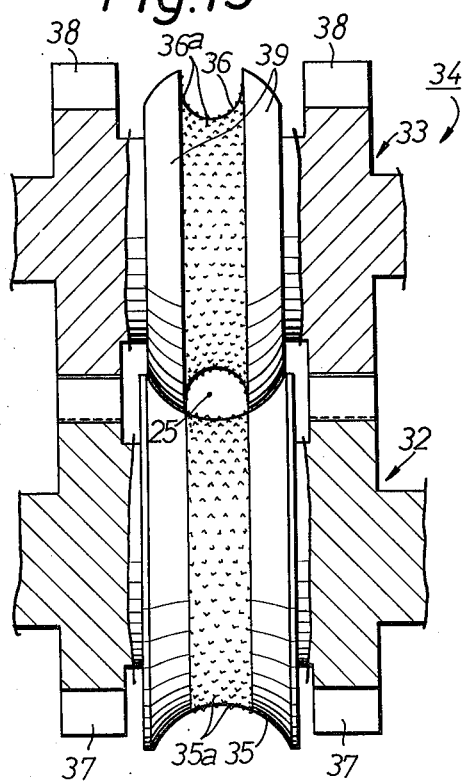

APPARATUS FOR MANUFACTURING UNTWISTED SYNTHETIC RESIN STRING

BACKGROUND OF THE INVENTION

Synthetic resin strings are extensively used for automatic packaging or binding machines, agricultural binders, hay balers and the like as well as for handicraft knitted articles.

The strings of this type are divided into twisted strings and untwisted strings.

Twisted strings are produced by mechanically twisting a stretched synthetic resin film or a split yarn or yarns obtained by longitudinally slitting a stretched synthetic resin film. However, the twisting operation is very inefficient and costly, entailing a low overall productivity and high manufacturing cost. The product itself, being twisted, has kinks or unevenly twisted portions, which tend to impede smooth movement of the string when it is paid out from a binder, producing a failure in binding operation. Moreover, the twist given to the string imparts stiffness to the string and impairs its shock-absorbing properties, with the result that the knot of binding string is liable to loosen.

Since the strings of the latter type are not twisted, they can be manufactured more efficiently and inexpensively than twisted strings, have improved smoothness and shock-absorbing properties and are lightweight and flexible, but if a stretched thermoplastic resin film is made into a thin string merely by being passed through a bundling ring or the like without twisting, the string will loosen and unfold to the original planar film, failing to retain shock-absorbing properties and bulkiness. Moreover, the string will then be prone to tearing. These objections make the string no longer serviceable for a binder. To eliminate such deficiencies, it has been practiced to cover the string with a film tube or to heat-set the string so as to prevent loosening and unfolding of the string. However when covered with the tube, the resulting double construction deteriorates the advantages of untwisted string described and entails reduced productivity and increased manufacturing cost, whilst the heat-setting treatment, unless conducted ingeniously, produces variations in the diametrical size of untwisted string. When subjected to excess heat-setting treatment, the string which is made of thermoplastic synthetic resin is hardened to exhibit poor flexibility, and when hardened up to its interior, the string fails to retain satisfactory shock-absorbing properties and characteristics of untwisted string.

SUMMARY OF THE INVENTION

An object of this invention is to overcome the foregoing drawbacks and to provide an apparatus for efficiently manufacturing an untwisted string having a spiral cross section with one edge of a film strip material helically rolled around the outer periphery of the string unlike conventional untwisted strings, such that the string is prevented from loosening and unfolding to the greatest possible extend even when it is not heat-set.

Another object of this invention is to provide an apparatus for continuously manufacturing an untwisted string which is lightweight, flexible, free of fluffiness and excellent in shock-absorbing properties, bulkiness, hand, uniformity, tensile strength and binding ability.

Another object of this invention is to provide an apparatus for producing an untwisted string having a spiral cross section including heat-settng means for heat-setting a rolled-up film strip or heating means for heat-setting a film strip before it is rolled up into a string without impairing the characteristics of untwisted string so as to render the string free of loosening or unfolding and to permit the string to retain shock-absorbing properties, impact resistance, bulkiness, flexibility and binding ability.

Still another object of this invention is to provide an apparatus for producing an untwisted string having a spiral cross section by which the string can be rendered wavy or embossed to improve the hand of the string and prevent unfolding and loosening of the string.

The problems described can be overcome by an apparatus comprising stretching means for stretching a strip of thermoplastic resin film at least longitudinally thereof, first guide means disposed to the rear of the stretching means and comprising a pair of rotatable members for nipping the stretched film strip on its front and rear surfaces widthwise thereof, second guide means disposed to the rear of the first guide means and located at a position deviated from the direction of straight advance of the film strip toward one side, and takeup means disposed to the rear of the second guide means. When the stretched film sent out from the first guide means passes through the second guide means, the second guide means restrains one side edge of the film strip. The opposite side edges of the stretched film strip are progressively gathered together toward the direction of advance of the film strip while the film strip advances from the first guide means to the second guide means. The restrained one side edge of the film strip is thereby rolled up helically, permitting the other side edge thereof to be helically rolled around the resulting rolled portion, whereby an untwisted string having a spiral cross section is obtained.

The basic construction described above further includes heat-setting means for fusing the outer peripheral surface of the string or the free end of the film strip which helically extends around the outer peripheral surface or the surface layer. The heat-setting means is incorporated into the second guide means itself or is disposed in front of or to the rear of the second guide means.

Further according to this invention, embossing means comprising a pair of rotatable members having projections is disposed to the rear of the second guide means to emboss the untwisted string having a spiral cross section.

The above and other objects, features and advantages of this invention will become apparent from the following description given with reference to the accompanying drawings showing embodiments of this invention for illustrative purposes only.

BRIEF DESCRIPTION OF THE DRAWINGS

FIG. 1 is a schematic diagram showing a basic embodiment of the apparatus of this invention;

FIG. 2 is an enlarged plan view showing the principal part of the same;

FIG. 3 is a plan view showing the principal part of another embodiment of this invention in which heat-setting means is incorporated in second guide means;

FIG. 4 is an enlarged view taken along the line IV—IV in FIG. 3;

FIG. 5 is a plan view showing another embodiment of this invention in which spur gears incorporating heat-setting means are disposed to the rear of the second guide means;

FIGS. 6 (I) and (II) are fragmentary enlarged views in section showing two examples of the heat-setting means in FIG. 5;

FIG. 7 is a view showing the heat-setting means of FIG. 6 (I) to illustrate heat-setting operation;

FIG. 11 is a plan view similar to FIG. 9 and showing another embodiment;

FIG. 12 is a plan view showing embossing means disposed to the rear of the second guide means;

FIG. 13 is an enlarged front view showing an example of embossing means; and

FIG. 14 is a perspective view showing an example of untwisted string obtained by the apparatus of this invention.

DETAILED DESCRIPTION OF THE INVENTION

Figure 8:
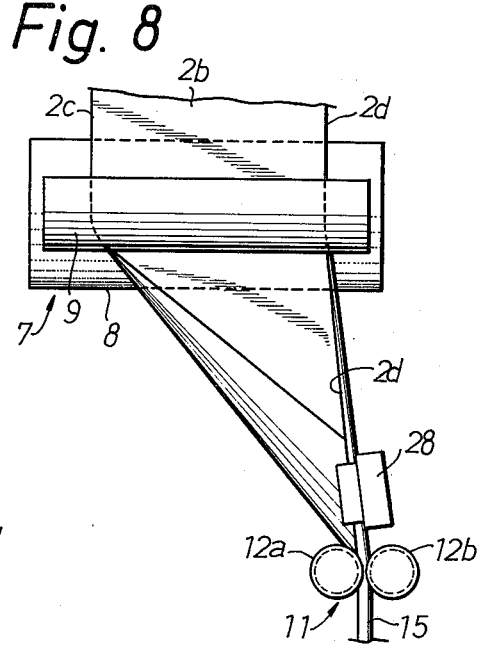
FIG. 8 is a plan view showing the principal part of another embodiment of this invention in which heating means for heat-setting is disposed in front of the second guide means.

With reference to the drawings, especially to FIGS. 1 and 2, a basic embodiment of the present apparatus for producing an untwisted string will be understood. Indicated at 1 in FIG. 1 is a melt extruder for producing a film from thermoplastic resin such as polyethylene, polypropylene or the like. The extruder may be adapted for inflation process or for T-die process. A film 2 is extruded from the extruder 1 and then cooled by cooling means 3 or left to stand for cooling. Subsequently, the film is cut by a slitter 4 into strips 2a having a specified width, each of which is sent into an infrared oven 5 or the like and rendered stretchable by heating.

Disposed to the rear of the oven 5 is stretching means 6 comprising, for example, a group of nip rolls rotatable at different circumferential speeds. The film strip 2a sent out from the oven 5 is stretched and oriented at least longitudinally thereof. To the rear of the stretching means 6 there is first guide means 7 comprising a pair of rotatable rolls 8 and 9 for nipping the stretched film strip 2b on its front and rear surfaces widthwise thereof. The rotatable roll 8 of the pair is provided with a rubber layer 10 around its outer peripheral surface and is driven positively in the direction of straight advance of the film strip, whilst the other rotatable roll 9 is adapted for idle rotation. Accordingly, the stretched film strip 2b fed to the first guide means 7 is guided by the roll 8 with its rear surface in pressing contact with the roll 8 under the action of the roll 9, while being nipped widthwise by the two rolls cooperating with each other. The rolls 8 and 9 are positioned transversely of the direction of straight advance of the stretched film strip 2b, substantially at right angles to that direction as seen in FIG. 2.

Located to the rear of the first guide means 7 and at a position deviated from the direction of advance of film strip toward one side thereof is second guide means 11, which comprises a pair of grooved guide sheaves 12a and 12b in the embodiment shown in FIG. 2. The axes of the sheaves are perpendicular to the plane of the film strip. When the stretched film strip 2b sent out from the first guide means 7 passes through the second guide means 11 which is positioned as deviated toward one side of the direction of straight advance of the film strip, the groove of guide sheave 12a of the second guide means 11 restrains one side edge 2c of the film strip which side edge is on the opposite side to the deviated side. The other side 2d of the film strip advances obliquely. The film strip is progressively gathered while travelling from the first guide means 7 to the second guide means 11. More specifically, after passing through the first guide means 7, one side edge 2c of the stretched film strip 2b is restrained by the sheave 12a of the second guide means 11 so as to turn or roll in the direction of the deviation, whilst the other side edge 2d advances obliquely. The side edge 2c is therefore helically rolled inward, and the other side edge 2d of the film strip is helically rolled around the resulting rolled portion. When the strip has passed through the second guide means 11, an untwisted string 15 is obtained which has a spiral cross section, such that the side edge 2d is helically rolled around the outer peripheral surface of the string. The untwisted string is thereafter guided by a guide roller 13 and continuously wound around takeup means 14. The interior of untwisted string 15 having a spiral cross section and rolled up in helical manner is not adhered but in loose state and the string is therefore flexible. The string has clearances in its spiral interior, which impart the string high shock-absorbing properties and elasticity, and when used for binding, the string will not loosen. Because the other side edge 2d helically extends around the inner rolled portion, the string has a uniform thickness. Unlike strings which have a rolled-up construction with the side edge extending rectilinearly or which are produced simply by folding a film strip, the string of this invention will not loosen or unfold and always has a smooth and slippery surface. When used as a binding string for a binder or the like, the string is free of tearing to the greatest possible extent, assuring continuous binding operation.

The second guide means may comprise sheaves or rollers which are rotatable as shown in FIG. 2 or like members which are not rotatable positively or idly. Instead of using two members, only one member is usable as installed in the position indicated at 12a in FIG. 2.

FIGS. 3 and 4 show another embodiment for producing an improved untwisted string having a spiral cross section and in which the above-mentioned side edge 2d is completely prevented from loosening and unfolding. According to this embodiment, the second guide means 11 comprises a looped guide member 16 made of a heat-conductive material for passing a rolled untwisted string. The looped guide member 16 encloses an unillustrated heater and is supported by a holder 17. A wire 18 is connected to the heater to pass current to the heater. As seen in FIG. 4, the looped guide member 16 is in the form of a gently bent closed loop defining a gathering space 19. The space has a narrow upper portion and wide lower portion and resembles a drop of water as illustrated. The space 19 is so dimensioned that the largest diametrical width thereof is equal to or smaller than the diameter of the string 15.

When the stretched film strip 2b sent out from the first guide means 7 passes through the space 19 of the second guide means 11, one side edge 2c of the film strip is restrained by an inner peripheral portion 19a of the looped guide member 16, whereas the other side edge 2d obliquely advances while being restrained by the opposing inner peripheral portion 19b of the member 16, whereby the rolled untwisted string 15 shown in FIG. 14 is obtained. When energized and heated, the heater enclosed in the heat-conductive guide member 16 heat-seals the surface layer of the untwisted string to the underlying layer when the film strip is gathered into such string. Especially because the space 19 of the looped guide member 16 is in the form of a droplet of water and because the largest width of the space is equal to or smaller than the diameter of the string, at least one half of its peripheral surface of the string comes into contact with the inner peripheral surface of the looped guide member 16. As a result, the other side edge 2d of the film strip which extends helically can be heat-sealed to the surface of the underlying layer, whereby the side edge is completely prevented from loosening or unfolding. The second guide means 11 which comprises the looped guide member 16 enclosing the heater is capable of heat-sealing only the outer peripheral surface of the untwisted string 15, permitting the interior rolled portion of the string 15 to remain in loose state. Therefore the heat-sealing treatment effected as described above will not impair the unique characteristics of untwisted string such as the shock-absorbing properties, elasticity and binding ability of the string. Although not shown, the looped guide member 16 in FIG. 4 can be provided to the rear of the second guide means 11 in FIG. 2. The member 16 renders the untwisted string obtained free of loosening and unfolding and uniform in thickness, without deteriorating the characteristics of untwisted string.

FIGS. 5 to 7 show another embodiment in which heat-setting means 22 comprising a pair of spur gears 20 and 21 is disposed to the rear of the second guide means 11. In this embodiment, the second guide means 11 may comprise guide sheaves, guide rollers, a looped guide member resembling one shown in FIG. 4 but including no heater, or a single sheave or roller corresponding to one indicated at 12a in FIG. 12.

With reference to FIGS. 5 to 7, circumferential cutout portions 23a and 24a are formed in the teeth 23 and 24 of spur gears 20 and 21. When the spur gears 20 and 21 mesh with each other, the cutout portions 23a and 24a provide a passage 25 for the untwisted string 15 as illustrated in FIG. 6 (I). Each of the spur gears 20 and 21 has a heater (not shown) embedded therein. Alternatively, the teeth 23 of one gear 20 or the teeth 24 of the other gears 21 only may be circumferentially cut out to provide a similar passage, or one spur gear 20 circumferentialy cut out as at 23a may be used in combination with the other gear 21 having teeth or reduced height as illustrated in FIG. 6 (II).

The spur gears 20 and 21 mesh with each other, with the passage 25 positioned on the line of travel of the string, and one of the gears is positively driven in the direction of advance of the string. The untwisted string 15 sent out from the second guide means 11 will then be heat-set in the manner shown in FIG. 7 when passing through the passage 25.

If the circumferential cutout portion 23a or 24a is not formed in one of the gears 20 and 21 meshing with each other, the passage 25 will be an undulating passage, permitting the gears to forcibly uniformly compress and flatten the string to eliminate internal clearances in the string, thereby nullifying the shock-absorbing properties of the string. According to this invention, however, a circumferential cutout portion is formed in at least one of the gears 20 and 21 to provide the passage 25. With this construction, only the opposing meshing shoulder portions 26 and 27 act to suitably heat and compress the string, whilst the tooth of one gear 20 and the furrow of the other gears 21 give a wide passage in which the string is not subjected to heating and compression. As a result, after passing through the heat-setting means 22, the string 15 is formed with alternating heat-set small-diameter portions 15a and large-diameter protions 15b which are not heat-set. Thus the string is rendered wavy by heat-setting. The large portions 15b include clearances and retain shock-absorbing properties. The large and small portions 15b and 15a give an improved binding ability to the untwisted string.

FIG. 8 shows another embodiment of this invention in which heating means 28 is provided on the deviated side of path of the film strip in front of the second guide means 11. The heating means 28 may be the electric heater type, gas heater type or the like. When an electrical heater is used, it is disposed on one side of the film strip, with its hot plate in sliding contact therewith or spaced apart therefrom to heat the side edge 2d to a temperature suitable for heat-sealing.

When the hot plate is disposed in sliding contact with the film strip, the hot plate is covered with Teflon or silicon so as to prevent fusion of the strip to the hot plate. In the case where a gas heater is used, one side edge 2d of the film strip is fused with hot air, nitrogen, argon or like hot gas. It is seen in FIG. 8 that between the first guide means 7 and the second guide means 11 the heating means 28 is disposed at the same side as the second guide means 11 located as the deviated position, such that before the film strip is gathered into a roll by the second guide means 11, one side edge 2d of the strip to be externally rolled around the untwisted string 15 is melted by preheating. Consequently the molten side edge 2d is rolled by the second guide means 11 and, at the same time, adhered to the outer peripheral surface of the opposite side of the strip which has been rolled up. Accordingly the internal rolled layers of the untwisted string formed by this embodiment remain completely loose and are helically surrounded by the edge 2d, the entire length of which is completely adhered to the underlying layer to prevent loosening and unfolding of the string.

Figure 9:
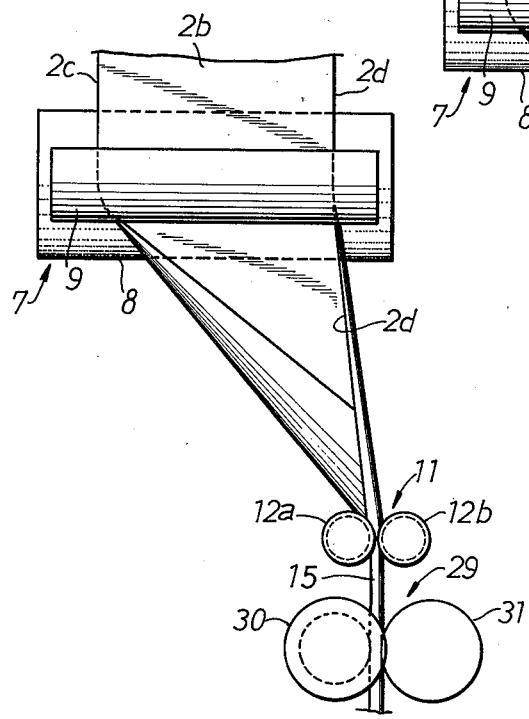
FIG. 9 is a plan view showing heat-setting means utilizing frictional heat and disposed to the rear of the second guide means.
Figure 10:
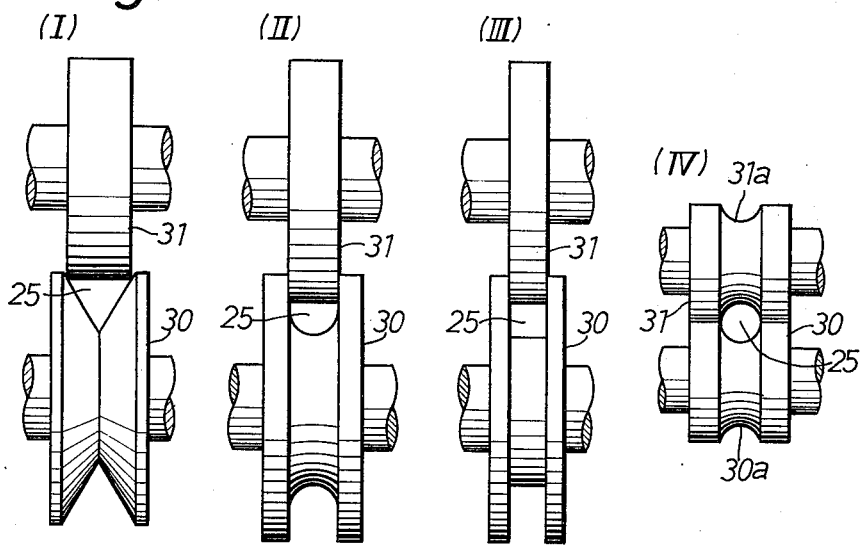
FIGS. 10 (I), (II), (III) and (IV) are enlarged front views showing several examples of heat-setting means of FIG. 9.

FIG. 9 and 10 (I), (II), (III) and (IV) show heat-setting means 29 disposed to the rear of the second guide means 11 and comprising two opposing rotatable members which are positively driven at a speed higher than the speed of travel of the string to utilize the resulting frictional heat for heat setting.

More specifically, the pair of rotatable members comprises the combination of roller 30 having a V-shaped groove and plain roller 31 as shown in FIG. 10 (I), the combination of flanged roller 30 having a U-shaped groove and plain roller 31 as seen in FIG. 10 (II), the combination of flanged roller 30 and plain roller 31 as illustrated in FIG. 10 (III), or the combination of two rollers 30 and 31 having circumferential grooves 30a and 31a (FIG. 10 (IV)). In any of the above combinations of rotatable members 30 and 31, a small passage 25 is formed therebetween which has a size equal to or slightly smaller than the diameter of the string. At least one of the rotatable members is driven at a higher speed than the speed of advanace of the string. It is rotated in the same direction as the direction of advance of the string or in opposite direction thereto. The latter case is advantageous in that more intensive frictional heat is available. According to this embodiment, the string 15 rolled up by the second guide means 11 passes through the passage 25 defined by the pair of rotatable members 30 and 31 while at least one of the rotatable members 30 is being driven at a speed higher than the speed of advance of the string. At this time the frictional contact between the outer peripheral surface of the string 15 and the peripheral surface defining the passage 25 produces frictional heat, which fuses the entire peripheral surface of the string 15. The fused surface is thereafter solidified into a thin film which serves to prevent the string from loosening and unfolding. The film thus formed only on the outer surface of the string permits the string to retain the characteristics of untwisted string.

If the heat-setting means 29 illustrated in FIGS. 9 and 10 is employed in place of the looped guide means 16 shown in FIG. 3, the second guide means 11 will serve also as the heat-setting means.

FIG. 11 shows a modification of the embodiment of FIG. 9 in which the heat-setting means 29 disposed to the rear of the second guide means 11 comprises a single grooved member 30 which is rotatable at a speed higher than the speed of advance of the string. According to this embodiment, the outer peripheral surface of the string will not always be heat-set depending on the shape of the circumferential groove of the rotatable member 30. However, when the string 15 with the edge 24 extending helically therearound advances in contact with the rotatable member 30, it is assured that the edge 2d will be heat-set all the time although intermittently. The surface layer of the rolled-up strip which is brought into contact with the grooved portion of the rotatable member 30 is also heat-set. Of course the entire length of the edge 2d can be heat-set if at least two rotatable members 30 are arranged along the direction of advance of the string alternately on the opposite sides of the path of travel of the string as seen in FIG. 11. In the case where a plurality of the rotatable members 30 are used as above, the members may be so arranged that the string will travel along a bent path when so desired.

FIGS. 12 and 13 show another embodiment in which embossing means 34 comprising a pair of rotatable members 32 and 33 is provided to the rear of the second guide means 11. If the second guide means 11 is equipped with heating means, or if it is not provided with heating means but an unillustrated heating oven or the like is disposed in the path of travel of the string before it enters the embossing means, the embossing means 34 need not be equipped with heating means. In these arrangements, it is assured that the untwisted string 15, when passing through the embossing means 34, has been softened to some extent suitable for embossing operation.

Of course the embossing means 34 may incorporate a heater or like heating means. With reference to FIG. 13, the rotatable members 32 and 33 have circumferential grooves 35 and 36 U-shaped in section and gears 37 and 38 meshing with each other at the opposite sides thereof. The circumferential grooved portion 35 and 36 are formed with projections 35a and 36a of a suitable pattern. The rotatable member 33 of the pair has circumferentially extending flanges 39 and 39 at its opposite sides which fit in the groove 35 in the opposing rotatable member. The space defined by the grooved portions 35 and 36 provides a passage 25 which is slightly smaller than the diameter of the string 15. The string 15 passes through the passage 25.

One of the rotatable members 32 and 33 is positively driven in the direction of travel of the string. Since the gears 37 and 38 mesh with each other, both rotatable members 32 and 33 are rotated in the direction of advance of the string to emboss the string with the projections 35a and 36a when the string passes through the passage 25. The flanges 39 and 39 fitted in the groove 35 serve to confine the surface portion of the string within the passage 25 when the string passes through the passage 25. As a result, the string can be embossed while being passed through the passage as completely embrace by the opposing members. The untwisted string obtained by this apparatus has a surface layer which is dotted with lightly fused portions which prevent the string from loosening or unfolding. Since the projections 35a and 36a have a small height, the interior of the string remains loose, permitting the string to retain shock-absorbing properties, elasticity and flexibility.

It will be apparent that the objects of this invention can be fully fulfilled by the embodiments described above. The untwisted string, being subjected to stretching treatment, has excellent impact strength and tensile strength.

It will be apparent to one skilled in the art that various alterations and modifications can be made to the preferred embodiments described above. For example, small grooves may be formed, as spaced apart widthwise, in the die of extruder of the T-die type to form longitudinal projections on the opposite surfaces or one surface of the film extruded for use as the material of the string. The film to be used as a material may be stretched biaxially using another stretching means of the tenter type for stretching the film widthwise. Thus the present invention is not limited to the disclosure given above with reference to the drawings but includes various modifications and alterations within the scope of the claims.

What is claimed is:

1. An apparatus for manufacturing an untwisted synthetic resin string comprising stretching means for stretching a strip of thermoplastic resin film at least longitudinally thereof, first guide means disposed to the rear of the stretching means and comprising a pair of rotatable members for nipping the stretched film strip on its front and rear surfaces widthwise thereof, second guide means disposed to the rear of the first guide means and located at a position deviated from the direction of straight advance of the film strip toward one side, and takeup means disposed to the rear of the second guide means, the second guide means including a portion for restraining one side edge of the stretched film strip opposite to the deviate side when the stretched film sent out from the first guide means passes through the second guide means, the second guide means being located in the deviated position so that the opposite side edges of the stretched film strip are progressively gathered together toward the direction of advance of the film strip while the film strip advances from the first guide means to the second guide means, the restrained one side edge of the film strip being thereby rolled up helically, permitting the other side thereof to be helically rolled around the resulting rolled portion.

2. The apparatus as set forth in claim 1 wherein heat-setting means is disposed between the second guide means and the takeup means, the heat-setting means comprising a looped member under heating conditions to melt the film strip, the looped member having an inner peripheral wall for contact with the outer peripheral surface of the gathered string.

3. The apparatus as set forth in claim 1 wherein heat-setting means is disposed between the second guide means and the takeup means, the heat-setting means comprising a rotary member, and an untwisted string sent out from the second guide means passes by the rotary member in contact therewith, the rotary member being rotatable at a speed higher than the speed of advance of the untwisted string.

4. The apparatus as set forth in claim 1 wherein embossing means is disposed between the second guide means and the takeup means, the embossing means comprising a pair of heated rotary members each having a circumferential groove, the grooved portions of the rotary members being formed with projections and defining a passage.

5. The apparatus as set forth in claim 1 wherein heating means is provided between the first guide means and the second guide means, the heating means being so positioned as to heat only one one side edge of the stretched film strip on the deviated side of the second guide means to a temperature suitable to fuse the side edge.

6. The apparatus as set forth in claim 1 wherein heat-setting means is provided between the second guide means and the takeup means, the heat-setting means comprising a pair of spur gears rotatable in the direction of advance of the string, the teeth of at least one of the gears being circumferentially cut out.

7. The apparatus as set forth in claim 1 wherein heat-setting means is provided between the second guide means and the takeup means, the heat-setting means comprising a plurality of rotary members rotatable at a speed higher than the speed of advance of the string, the rotary members being so arranged as to nip the string in contact therewith.

8. An apparatus for manufacturing an untwisted synthetic resin string comprising stretching means for stretching a strip of thermoplastic resin film at least longitudinally thereof, first guide means disposed to the rear of the stretching means and comprising a pair of rotatable members for nipping the stretched film strip on its front and rear surface widthwise thereof, second guide means disposed to the rear of the first guide means and located at a position deviated from the direction of straight advance of the film strip toward one side, and takeup means disposed to the rear of the second guide means, the second guide means comprising a looped member under heating conditions to melt the film strip, the looped member having an inner peripheral wall to gather the stretched film into a roll.

9. An apparatus for manufacturing an untwisted synthetic resin string comprising stretching means for stretching a strip of thermoplastic resin film at least longitudinally thereof, first guide means disposed to the rear of the stretching means and comprising a pair of rotatable members for nipping the stretched film strip on its front and rear surfaces widthwise thereof, second guide means disposed to the rear of the first guide means and located at a position deviated from the direction of straight advance of the film strip toward one side, and takeup means disposed to the rear of the second guide means, the second guide means comprising a rotary member for gathering the stretched film strip into a roll after the strip has been sent out from the first guide means, the rotary member being rotatable at a speed higher than the speed of advance of the string.

10. The apparatus as set forth in claim 8 wherein embossing member is provided between the second guide means incorporating heat-setting means and the takeup means, the embossing means comprising a pair of circumferentially grooved rotatable members, the grooved portions of the rotatable members being formed with projections and defining a passage.

* * * * *